US008825799B2

(12) United States Patent
Shuster

(10) Patent No.: US 8,825,799 B2
(45) Date of Patent: *Sep. 2, 2014

(54) REDIRECTION METHOD FOR ELECTRONIC CONTENT

(71) Applicant: Gary Stephen Shuster, Fresno, CA (US)

(72) Inventor: Gary Stephen Shuster, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,081

(22) Filed: Sep. 9, 2013

(65) Prior Publication Data

US 2014/0013403 A1 Jan. 9, 2014

Related U.S. Application Data

(63) Continuation of application No. 11/744,043, filed on May 3, 2007, now Pat. No. 8,533,283.

(51) Int. Cl.
*G06F 15/16* (2006.01)
*G06F 15/173* (2006.01)
*G06F 17/30* (2006.01)
*H04L 29/06* (2006.01)

(52) U.S. Cl.
CPC ........ *H04L 63/083* (2013.01); *G06F 17/30867* (2013.01); *H04L 29/06047* (2013.01)
USPC ............................ 709/217; 709/218; 709/219

(58) Field of Classification Search
CPC ............ H04L 29/06047; H04L 63/083; H04L 63/0281; G06F 17/30867
USPC .................................................. 709/217–219
See application file for complete search history.

(56) References Cited

U.S. PATENT DOCUMENTS

| | | | |
|---|---|---|---|
| 5,870,546 A | 2/1999 | Kirsch | |
| 6,401,077 B1 | 6/2002 | Godden et al. | |
| 6,571,295 B1 | 5/2003 | Sidana | |
| 7,200,863 B2 | 4/2007 | Shuster | |
| 2002/0073335 A1 | 6/2002 | Shuster | |
| 2002/0082926 A1 | 6/2002 | Shuster | |
| 2002/0138660 A1 | 9/2002 | Eilers et al. | |
| 2002/0147929 A1 | 10/2002 | Rose | |
| 2004/0158574 A1* | 8/2004 | Tom et al. | 707/102 |
| 2006/0184640 A1 | 8/2006 | Hatch | |
| 2008/0140803 A1 | 6/2008 | Shu et al. | |
| 2008/0183902 A1* | 7/2008 | Cooper et al. | 709/250 |

* cited by examiner

*Primary Examiner* — Chau Le
(74) *Attorney, Agent, or Firm* — Jonathan Jaech; Snell & Wilmer L.L.P.

(57) ABSTRACT

Electronic content, for example, a web page, is configured for display by a web browser application to include content that is not included in or referenced by the web page. The web page includes a first locator for first content. A second locator for second content is associated with the first locator in a database or other memory structure. In response to a request for the web page, the second locator is obtained. Access to the second locator may be secured. The second locator may be swapped with the first locator to cause the web browser application to obtain the second content instead of the first content. In the alternative, the second content may be obtained and provided to the web browser instead of, or in addition to, the first content.

24 Claims, 3 Drawing Sheets

*Fig. 3A*
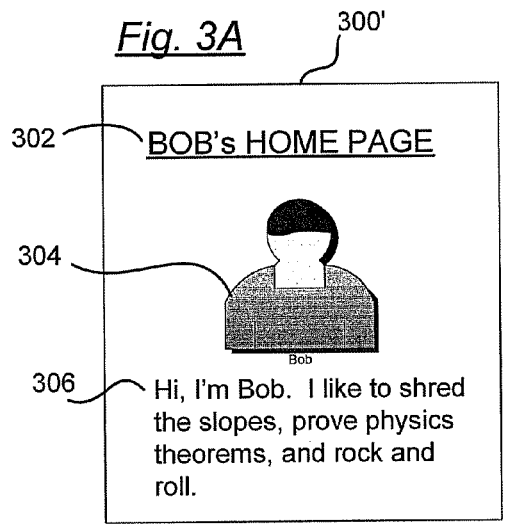
*Fig. 3B*
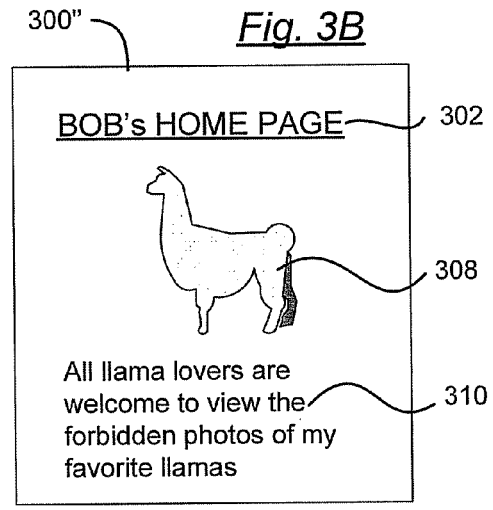
*Fig. 4A*
REDIRECTION SETUP PAGE
Page Address: http://www.firsthost.net/bob929/index.html
Original Obj. Address: http://www.firsthost.net/bob929/bob.gif
Replacement Obj. Address: http://www.secondhost.net/bob929/llama.gif
Secured? ☒ Yes ☐ No
Password: bobsllamas567

REDIRECTION SETUP PAGE

Page Address: http://www.firsthost.net/bob929/index.html
Start Tag: bobstxt999s    End Tag: bobstxt999e
Replacement Content Address: http://www.secondhost.net/bob929/llama.txt
Secured? ☒ Yes  ☐ No
Password: bobsllamas567

REDIRECTION METHOD FOR ELECTRONIC CONTENT

CROSS-REFERENCE TO RELATED APPLICATIONS

This application is a continuation of U.S. patent application Ser. No. 11/744,043, now U.S. Pat. No. 8,533,283, which is specifically incorporated by reference herein in its entirety.

BACKGROUND OF THE INVENTION

1. Field of the Invention

The present invention relates to a method and system for automatically redirecting specified users of a computer network to alternative network content replacing content contained within an original network information object.

2. Description of Related Art

As the Internet becomes increasingly regulated, content providers may face difficulties providing certain content to users who are not permitted to view it using certain regulated hosts or client systems. For example, many hosting services restrict the content that users may place on the system. Likewise, on the client side, many clients reside behind firewalls or other network traffic filters that filter out specific types of content. In addition, many nations, states, and other legal jurisdictions impose different restrictions on content, causing some content providers to limit available content to content that is acceptable to the most restrictive of all jurisdictions to which the content is intended to be transmitted. A further limitation may be encountered when clients desire to access content that is translated into languages, or includes technology, that are not supported by the system hosting the content. In each of the foregoing examples, content providers may be preventing from reaching their intended audience with their intended content. Content consumers may be prevented from accessing the information they desire. Communication in both directions may be impeded.

For such providers and consumers, there is no alternative way to provide or receive the desired content without using alternative hosts that do not restrict content, or alternative clients that are not subject to filtering. Actually using an alternative host or client may be impracticable or impossible for many users. In addition, tailoring content for multiple jurisdictions might require the use of numerous hosts, each with different content restrictions, driving up the cost of content distribution. Therefore, it is desirable to provide a method or system that permits users to provide or access content using hosts or clients that would otherwise restrict such content or that would prevent an intended communication from occurring.

SUMMARY OF THE INVENTION

The present invention provides a method and system for redirecting users to private, hidden, or localized content. The invention may be used to circumvent restrictions imposed by hosting services or Internet filters, but is not limited to such applications. The invention may be used in any circumstance in which it is desired to direct users to alternative content that is not visible to the primary content host or to a filtering application, such as may be employed by an organization's firewall. The invention may also be used to enforce content restrictions imposed by a host or client, to substitute acceptable content for restricted content. The invention may also be used to supply alternative content that is not technically compatible with a host for primary content.

In an embodiment of the invention, a database of network addresses, for example, URL's (Uniform Resource Locators), may be maintained at a network-accessible or locally stored location. The database may be accessible to one or more proxy servers or redirector applications, or to a browser configured to utilize such database. In an embodiment of the invention, redirector applications may be implemented as software plug-ins for Web browser applications operating on the client side. Each client may operate its own browser plug-in or other application. In the alternative, or in addition, similar functions are performed by a proxy server located upstream of the client.

When implemented as a browser function, browser plug-in or other client-side application, the redirector application intercepts each URL or other network address entered by a user, or referenced by html or other code on a page viewed by a user, before the address is operated on by the web browser software to request content. The redirector application consults a database of URL's or other addresses to see if the requested network address is listed. The address may be for an entire web page, domain name or any web object having a network address. In an alternative implementation, the address may reference locally stored content, or content distributed other than via a network, such as on a DVD or other storage media. In another alternative, the address may reference content stored on a secondary network, a LAN, or a LAN hosted non-internet-routable address, such as 192.168.1.*. Addresses for which swapped or redirected content are available are listed in the database, having been previously placed there by the user, by one or more content providers or by one or more third parties providing modifications to the content. The database also includes one or more references to substitute content associated with the requested address. For example, if the requested address is for a web page, the database may identify one or more linked objects on the page, and provide for each identified object a substitute object. In the alternative, the database may indicate a substitute object for the entire requested object.

If the requested address is not listed in the database, the redirector application may pass the address to the web browser application for normal handling. If the requested address is listed, the redirector application may request and receive the first object, parse it to identify the links to objects listed in the database as having substitutes, replace these links with links to the substitute objects, and pass the altered object containing the substituted links to the web browser for normal handling. In the alternative, if the entire object is designated for substitution, the redirector application may pass a link to the substitute object to the web browser.

Substitute content may be located in any locally or network-accessible location. In an embodiment of the invention, substitute content may be located at a dynamic remote Internet Protocol (IP) addresses to avoid content blocking by blacklisting. A dynamic remote IP address is one which changes over time. This may be implemented with a dynamic DNS server in which the IP address associated with a particular domain name changes as a function of time, for example, by using a predetermined table of IP addresses and changeover times. In addition, or in the alternative, a lookup table for IP addresses or domain names may be placed in a publicly-accessible location or in a restricted location (e.g., a hidden or encrypted location) on a network accessible resource, or distributed via email or other method to subscribers. In the alternative, or in addition, substitute content may be stored on a peer-to-peer network accessible through the redirector application or other proxy. Another alternative is for users to create their own private swapout feeds, which would redirect requests for URL's only from specific clients or groups of clients.

Access to the substitute content may be controlled using various methods. One approach is to distribute the redirector application through a site that requires user identification. Substitute content could be provided only to designated users of the system, namely, to those who register with the site and download the redirector application. Alternatively, the content may be filtered by language code passed by the browser, by geolocated IP address, or by other methods of identifying specified user-specific information. In the alternative, a passcode may be stored in the database for each record, for group of records, or for access to the database generally. Users attempting to access the system or specific substitute content may be required to supply an appropriate passcode to access private content, or a selection of private content, or for access to all private content mapped through the system. A passcode may be required only for initial access to private content from a particular client, or prior to each access. In addition, or in the alternative, content may be designated as not requiring any passcode or prior registration for access. Any user with the redirector application or equivalent proxy server operating upstream of her client device may access such non-protected, swapped private content. In one alternative, if the redirected content is not available, the system attempts to fail over to the originally requested content.

On the content provider side, substitute content may be designated and provided using a network-connected service or manually transmitted, such as via DVD or other portable storage media, to the hosting site. The service may require content providers to register, after which the providers may designate links for which substitute content is to be provided, and upload substitute content. The service may operate to maintain and distribute database information. The service may optionally host advertising as a way to generate revenue. In the alternative, or in addition, a fee may be charged for registration or for use of the service.

Operation of the system may be illustrated by the following example. A host site provides free website pages for a community of users, but restricts the nature of objects that can be posted on website pages. For example, the host site might forbid photos of llamas. A user "Bob" who has invested a lot of time into creating his popular webpage hosted by the site wants to use to page to show pictures of his llama farm to his friends and other users "in the know." Bob contacts a redirection service over the Internet, registers, and fills out an on-line form indicating the URL of his web page at the host site, and the URL's for one or more photos on his page that he desires to replace with photos of his llama farm. Bob uploads the desired llama photos to the redirector service and indicates which URL's on his originating page should be associated with the llama photos. Optionally, Bob designates a passcode required for users to view the llama photos. The redirector service compiles this information into its redirection database and stores the substitute content. After this, other users having the redirector application installed on their client browsers may view Bob's llama photos instead of the original photos on Bob's webpage. Optionally, these users may be required to supply a passcode when accessing Bob's page, prior to initial access only, or prior to all access events.

A more complete understanding of the method and system for redirecting users to alternative content will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3A is a diagram showing exemplary aspects of an original hosted page as it may be displayed by a web browser application.

FIG. 3B is a diagram showing exemplary aspects of a hosted web page configured to include redirected content.

FIG. 4A is a diagram showing exemplary aspects of data that may be used to configure redirection for a web page tied to an original content locator such as a URL.

DETAILED DESCRIPTION OF THE PREFERRED EMBODIMENT

Exemplary methods and systems for configuring electronic content to include both original content from an original host and alternative content provided from an alternative host are disclosed herein. In the detailed description that follows, like element numerals are used to denote like elements that appear in the figures.

Figure 1:
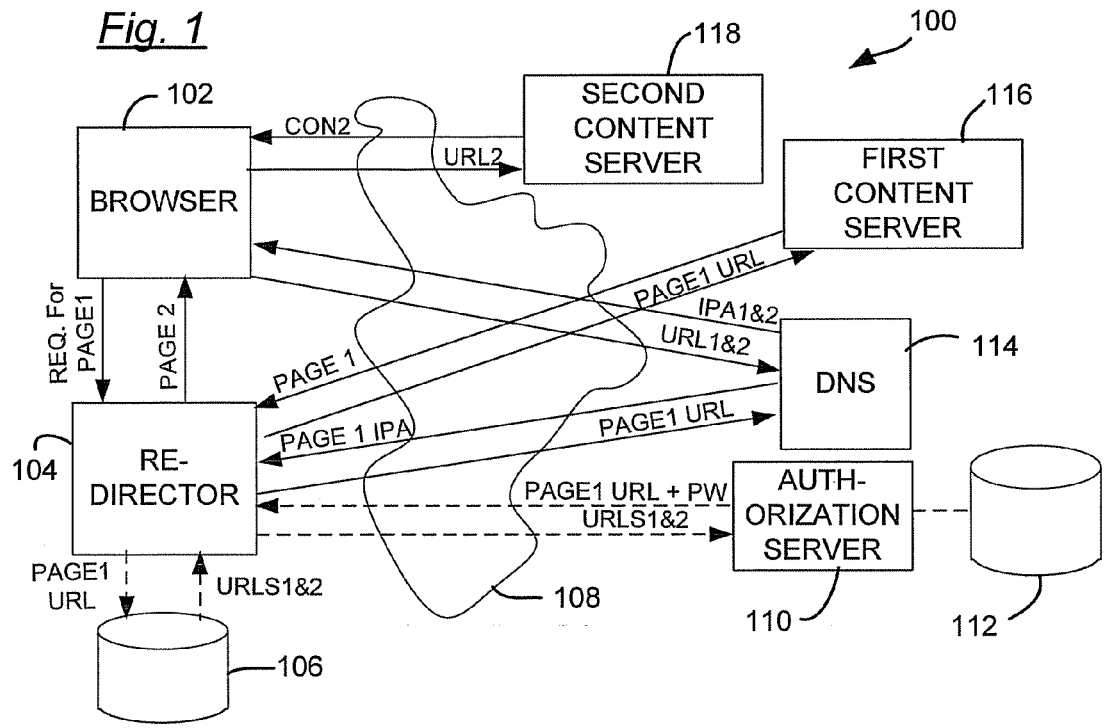
FIG. 1 is a block diagram showing exemplary aspects of a system for configuring electronic content for a web browser.

FIG. 1 is a block diagram showing exemplary aspects of a system 100 for configuring electronic content for a web browser 102. Web browser 102 may comprise any operable browser application operating, for example, on a personal computer, portable computer, hand-held computing platform with wireless network access, or cellular telephone equipped with network access. Various suitable browsers are known in the art for use with a wide variety of operating systems. Essential characteristics of a browser include obtaining and presenting electronic data on a output device in response to input of a network address for the data. Essential characteristics of a web browser include providing this capability for World Wide Web documents using a URL (Uniform Resource Locator) as the network address specifying the location of the document on the Internet. World Wide Web documents may include, for example, web pages formatted in HTML (Hyper Text Markup Language), XML (Extensible Markup Language), XHTML (Extensible HTML), or SGML (Standardized Generalized Markup Language). Web pages may include links to other objects, including graphics and video objects, text, and javascript or other coded objects. Links to other objects may be provided in the form of a URL indicating an object on the same server storing the web page, or on any other server. Browser 102 may be in electronic communication with various remote information sources, including first and second content servers, via a wide area network 108, such as the Internet.

A redirector application 104 may be provided by coding the operations described herein in any programming language suitable for the environment that the redirector application is to be implemented in. In embodiments of the invention, application 104 may be implemented in the same computing environment as the browser 102. For example, the redirector application may be coded as an application in a Windows™ or Unix environment on a general-purpose computer, in a Windows Mobile™, Opera™, Linux™ or Palm™ environment on a hand-held device or cellular phone. In alternative embodiments, redirector application 104 may be implemented at a server level upstream of a local client. For example, application 104 may be implemented at a gateway between a local area network or cellular network and the Internet, or at a gateway to a designated Domain Name Server (DNS) for browser 102. Generally, the redirector application should be positioned to operate independently of the host system for the original content, such as the first content server 116 in the exemplary system 100. The redirector application may be implemented as software, firmware, hardware, or any suitable combination of the foregoing. Implementing the redirector application 104 according to one of the alternative topologies as described above should provide its independent operation at an intervening location between the browser 102 and first content server 116.

Redirector application 104 may be in electronic communication with a database or other data structure holding information concerning original (first) content that is associated with redirected (second) content. In the illustrated embodiment, a local database 106 is depicted. In the alternative, or in addition, the redirector application may be in electronic communication with a remote database 112, optionally via an authorization server 110 and WAN 108. Authorization server 110 may be configured to determine whether or not a particular client is authorized to receive alternative content.

A Domain Name Server 114 may be in electronic communication with redirector 104 and browser 102. DNS 114 may comprise a single machine, a plurality of cooperating machines, or a plurality of independently operating machines. DNS 114 may be configured to operate according to a domain name system used with WAN 108, as known in the art. Such domain name servers may be configured to provide Internet Protocol (IP) addresses is response to requests, and may maintain domain name tables that correlate second (or lower) level domains to particular IP addresses. When presented with a URL, the DNS may provide the IP address corresponding to the lowest-level domain included in the URL. For example, if the domain name table includes an entry listing an IP address for www.root.com, the DNS will respond with the listed IP address when presented with a URL such as, for example, www.root.com/bob929/index.htm.

A first content server 116 may be in electronic communication with redirector 104 and browser 102 via WAN 108. Content server 116 may comprise any suitable network server as known in the art. The first content server may host an original (first) web page "PAGE1" for which it is desired to include alternative content "CON2" to some or all clients requesting access to PAGE1. As used herein, a "web page" refers to a text document coded in HTML, XML, XHTML, SGML, or equivalent mark-up language. A web page may include other components, for example Javascript or other executable computer code. The alternative content may be addressed by a locator "URL2", such as a URL. The original web page PAGE1 may comprise original or first content "CON1" that may be provided as a default, or provided to clients that are not authorized for access to alternative content CON2. The alternative content may be addressed by a locator "URL1."

First content server 116 may be subject to legal restrictions, technical limitations, or practical limitations that prevent it from hosting (e.g., storing and serving) the alternative content CON2. The original web page PAGE1 may include other information that it is desired to present together with alternative content CON2, or may otherwise be configured so that use of PAGE1 to present CON2 is somehow advantageous. For example, user views of PAGE 1 may provide some form of credit to its owner or other entity, or PAGE 1 may be located at an address that enjoys a historically large number of page views. At the same time, it may be desirable to omit any direct link to the alternative content in PAGE1. For example, server 116 may not be permitted to host any content that includes a link to the alternative content. If so, original page PAGE1 should not include the locator URL2 for the alternative content CON2.

A second content server 118 may also be in electronic communication via WAN 108 with browser 102 and redirector 104. The second content server may comprise any suitable network server as known in the art. The second content server 118 may host the alternative content CON2 instead of server 116, for any suitable reason. For example, server 118 may not be subject to the same technical or legal limitations that prevent server 116 from hosting the alternative content. At the same time, second server 118 may not be a suitable host for the original web page PAGE1. For example, the second server may exist in a domain that is less well-known than the domain used by the first server 116, or that otherwise does not enjoy the benefits provided by locating the original page on the first server. It should be apparent, therefore, that servers 116 and 118 make use of different domains and may even exist in separate legal jurisdictions.

Labeled arrows within FIG. 1 show exemplary information flows inside of system 100. Redirector 104 may receive a request for a web page or other network hosted object, e.g., PAGE1, from browser 102, that includes a URL or other locater for PAGE1. The redirector may use the PAGE1 URL to determine a locator for alternative content associated with the web page, if any. Redirector 104 may query a database 106 or other data structure using the PAGE1 URL, and the database may return URL1 and URL2 for the CON1 and CON2, respectively. In the alternative, the redirector may provide the PAGE1 URL plus a password to an authorization server 110, which after verifying that the redirector is authorized to receive the locator for the alternative content and consulting database 112 or other data structure, may return the URL's 1 and 2.

In addition, the redirector may transmit the PAGE1 URL to a DNS 114, and thereby receive an IP address for a server in the PAGE1 domain. After receiving the PAGE1 IP address, the redirector may request and receive the PAGE1 web page from the first content server 116. PAGE1 as received from the first content server should include a URL or other locator for the original content CON1 for which alternative content CON2 has been identified. PAGE1 should not include a URL or other locator for the alternative content. After receiving PAGE1, the redirector may prepare a modified web page, "PAGE2," by substituting URL1 with URL2 for the alternative content. PAGE2 should contain URL2 locating the alternative content and should not contain the URL1 locating the original content. The redirector 104 may then provide the modified web page PAGE2 to the browser 102.

Browser 102 may proceed to open PAGE 2 in any suitable fashion for providing output to an audio-visual output device, for example to a display screen, speaker, or both. While opening PAGE2, browser 102 may handle links or locators for external content, for example URL2, by requesting the content from an indicated source. For example, the browser may request and receive the alternative content CON2 from the second server, and provide a formatted output of the content as appropriate for the content, the web page, or for both. For further example, the alternative content may comprise a photograph or video sequence that is displayed with other elements of PAGE2 on a video display monitor.

Figure 2:
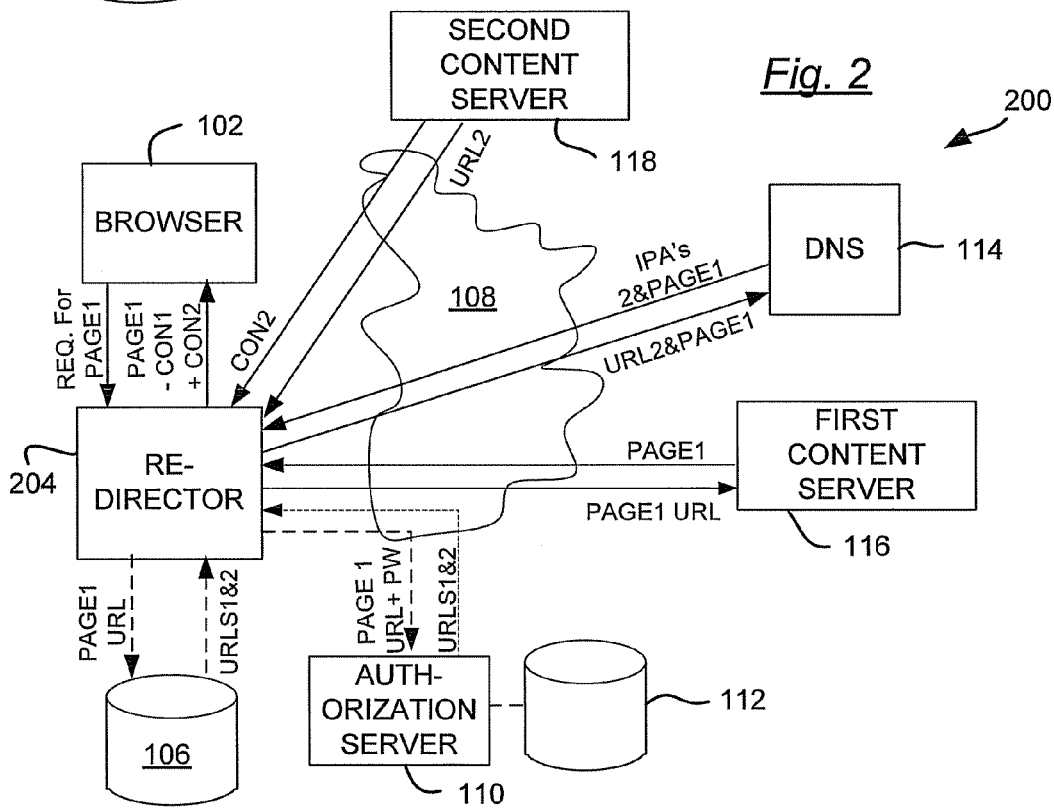
FIG. 2 is a block diagram showing exemplary aspects of a system for configuring electronic content for a web browser, according to an alternative embodiment.

FIG. 2 is a block diagram showing exemplary aspects of a system 200 for configuring electronic content for a web browser, according to an alternative embodiment. System 200 may comprise the same elements as system 100, except that the redirector 204 may be configured to operate differently from redirector 104 of system 100 sometimes, or all of the time. Redirector 204 may be configured to operate differently depending on the configuration of the original web page, operating in the way shown in FIG. 1 when the original web page is configured a first way and operating in the way shown in FIG. 2 when the original web page is configured a second way. For example, the operation depicted in FIG. 1 may be used when the original content that is associated with alternative content is indicated by a URL to an external source. The operation depicted in FIG. 2 may be used, for example, when the original content is indicated by tags marking the beginning and end of content, e.g., textual content, that is incorporated into the web page.

As in system 100, the redirector 204 may receive a request for an original web page PAGE1 from browser 102. PAGE1 may include a URL1 for original external content CON1 to be replaced with alternative content CON2. In the alternative, PAGE1 may include a tag indicating internal original content, such as textual data, that should be replaced with alternative content. Redirector 204 may query a database 106 or other data structure using the PAGE1 URL, and the database may return URL1 and URL2 for the CON1 and CON2, respectively. If the original content is not indicated by a URL, the database may return identifiers for "start" and "end" tags for the original content plus a URL2 for the alternative content. In the alternative, the redirector may provide the PAGE1 URL plus a password to an authorization server 110, which after verifying that the redirector is authorized to receive the locator for the alternative content and consulting database 112 or other data structure, may return the URL's 1 and 2 or the start and end tags.

System 200 differs from system 100 in that, after receiving the original web page PAGE1 from the first content server 116, the redirector 204 does not swap URL2 for URL1 to prepare a modified web page. Instead, the redirector 204 obtains the alternative content CON2 from the second content server 118 and places the alternative content directly into the original web page PAGE1, replacing any original content or links to original content therein, to prepare a second web page PAGE1. The second web page is then provided to the browser. In system 200, the alternative content CON2 and the original content CON1 should be compatible with data contained in the web page, such as text or executable script.

FIG. 3A is a diagram showing exemplary aspects of an original hosted page display 300' as it may be displayed by a web browser application. The page may include internal content and references to external content. For example, title 302 and text block 306 may comprise text that is included directly in the text data for the web page underlying the display 300'. Image 304 may comprise a graphic image that is contained in a separate file. The file for the original web page, e.g., an HTML file, may include a URL or other reference to the file containing the graphic image. When the browser opens the web page, it requests the graphic image, receives the file containing the image from its designated location, and generated the display 300' of the web page showing the image 304 in the location designated by the web page.

FIG. 3B is a diagram showing exemplary aspects of a hosted web page display 300"configured to include redirected content. The redirected content may include both internal text data 310 and externally-located data 303. Display 300" may also include data that is the same as display 300', for example, text heading 302. An authorized user to "Bob's" website may receive and view display 300", via the operation of the embodiments described herein. Meanwhile, an unauthorized user, or a user that had simply not set up their web browser application with an operative redirector application as described herein, may receive and view the original web page as it would appear in display 300'.

It should be apparent that, in embodiments of the invention, access is provided to alternative or substitute content on an exclusive, private basis. In other words, alternative content accessed via an original web page may be accessible only to clients that have configured their network browser specially to receive the alternative content, that have receive special authorization to receive the alternative content (such as via a password or certificate), or both. In other embodiments, the alternative content may be made available to all users that access the original web page via a specific portal or other network gateway. Access to the alternative content may be provided in these embodiments by configuring the redirector application to operate on all requests for web pages passing through a particular gateway. In both types of embodiments, an administrator or creator of the original web page for which it is desired to set up alternative content may desire to configure operation of the redirector application via a suitable interface.

FIG. 4A is a diagram showing an exemplary interface 400 and exemplary aspects of data that may be used to configure redirection for a web page tied to an original content locator such as a URL. Such an interface may be generated by a module or application operable in cooperation with a redirector application, a database for use with a redirector application, or both. The interface 402 may provide for input by a user of a URL or other locator 402 for an original web page. In embodiments of the invention, a particular user may not be permitted to designate a URL for a web page that does not exist in a domain known to be owned by the user. For example, an interface module may be configured such that a user registered as www.firsthost.net/bob929 would not be permitted to designate an original page that is outside of this domain. In other embodiments of the invention, a user may be permitted to designate any page for redirection of content.

Interface 400 may also provide for entry of any number of URL's or other locators 404 designating original content included in the page indicated by locator 402. For example, a locator 404 may comprise a URL for a graphic object, window, text block, or video. As an object included in the original page, locator 404 should be a text object or otherwise compatible with the data structure of the original web page. Interface 400 may further provide for entry of a second locator 406 for an object to replace the object designated by object 404. The replacement object indicated by the second locator should be of a type that is compatible with the layout of the web page. For example, to avoid disrupting the organization or display of the original web page, the replacement object may comprise a graphic object of the same size and resolution as the graphic object it replaces.

Interface 400 may further comprise an input object 408 configured to permit the administrator of the original web page to designate the replacement object as a secured object. For example, input object 408 may comprise a checkbox, a radio button, a simulated button, or other suitable object. When activated by the user, object 408 indicates that access should not be provided to the replacement object, except to authorized users. Unauthorized users may be provided with the original object indicated by locator 404, and thus, need not be aware that a replacement object is available. Interface 400 may be configured to permit the administrator to designate a password 410 or other access code for access to the replacement object. The password may be distributed by the administrator to participating users after clearing a security process. For example, the password may be written in a cookie file on authorized clients (optionally in encrypted form), after each client has been verified as authorized in a separate security procedure. After receiving the password, the authorized users may receive access to the replacement content. A password may be set up for each replacement object, for all replacement objects located in a particular domain, for all replacement objects accessible via a particular redirector application, or any suitable combination of the foregoing. Different passwords may be set for different levels of access.

Figures 4B, 5:
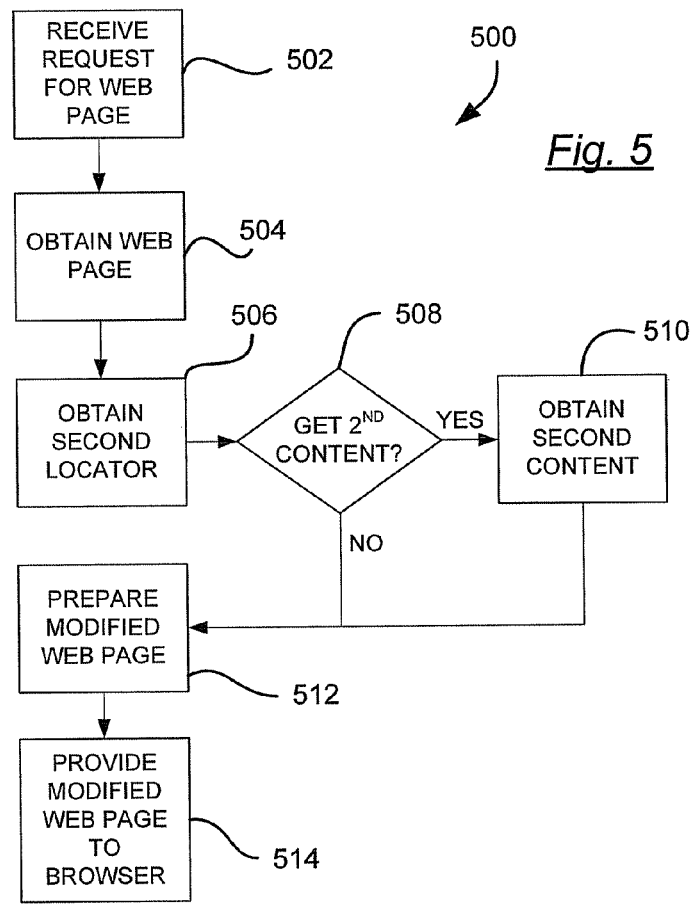
FIG. 4B is a diagram showing exemplary aspects of data that may be used to configure redirection for a web page tied to an original content locator such as tags embedded in a web page.
FIG. 5 is a flow chart showing exemplary steps of methods for configuring electronic content for redirection to alternative content elements.

As described above, replacement content may be provided for content, for example text content, located in a webpage between a set of tags serving as markers for the content to be replaced. FIG. 4B is a diagram showing exemplary aspects of an interface 450 that may be used to configure redirection for a web page tied to an original content locator such as tags embedded in a web page. Like the interface described in connection with FIG. 4A, interface 450 may provide for designation of an original page using a locator 402 and a locator 408 for replacement content. Likewise, interface 450 may permit an option for securing of the replacement content using an object 408 and password 410 as described above. Interface 450 may differ, however, by providing for indication of a start tag 452 and an end tag 454. Start and end tags may comprise any data compatible with the original web page that is useful for indicating the beginning or end of content that is to be replaced. In an embodiment of the invention, the tags 452, 454 may comprise data that is not incorporated into content for display or output on a user interface, for example, data coded as a comment or otherwise not displayed to the end user. In other embodiments, the tags 452, 454 may comprise data that is included in content for display or other output. For example, the start tag 452 may comprise the first several characters of a block of text to be replaced, while the end tag may comprise the last several characters. In this embodiment, the redirector application may be configured to replace the start and end tags, and any data between the tags, with the replacement content indicated by locator 406.

In general, more than one locator for alternative content may be defined, depending on a user class or individual identity. For example, different replacement content may be designated depending on the language of the requesting client, e.g., English, Chinese, French, etc. For further example, different replacement content may be specified based on a geographic region that the client request originates from. Still further, different passwords or other access codes may be distributed to provide access to different content. In these embodiments, the redirector application may replace the original content with different replacement content, depending on the value of a client-associated criterion.

In accordance with the foregoing, therefore, a method 500 is disclosed for configuring electronic content for a web browser, exemplary steps of which are shown in FIG. 5. Method 500 may be performed, for example, by a redirector application in communication with a web browsing application, as further described above in connection with FIGS. 1 and 2. At step 502, a redirector application may receive a request for an original (first) web page from a client-operated web browsing application. For example, the redirector application may receive an HTTP request. At step 504, the redirector application may obtain the first web page from a site hosting the page. In an embodiment of the invention, the web page includes a locator for first content, such as a graphic image, video, text block, applet, or other content to be displayed or output on an output device, as directed by the web page.

At step 506, the redirector application may obtain a locator for second content associated with the first web page, with the first content, or both. In an embodiment of the invention, a database or list may be searched using an identifier for the web page, such as its URL, to find one or more locators for first content on the web page that is to be replaced with second content. The first locator may be a single data item, such as a URL for the first content. The first locator may be a dual data item, such as start and end tags bracketing text data that is located in the web page itself. A second locator may be associated with the first locator in the database or list. In the alternative, second content may be associated with the first locator in the database or list. At step 506, the redirector application may search database or list and return the first and second locators, or the first locator and second content, for further processing.

Performance of step 506 may be conditioned on obtaining a password or other access code required for access to the substitute content from the requesting client. For example, the redirector application may check a cookie file on the requesting client to see if a required code has been provided. In the alternative, the redirector application may prompt the user to supply a password, or the user may be required to activate the redirector using a password before the redirector application will operate. If the required password or access code is not provided, method 500 may be aborted. If the method is aborted, the requesting web browser may simply output the requested web page in a normal fashion.

As indicated at steps 508 and 510, if the database does not include the alternative (second) content, it may be obtained from an external source, for example, from an external host. In the alternative, if the second content is not to be obtained at this time, it may be deferred until a later step and performed by the web browser, as described below. At step 510, the redirector application may send out an HTTP or other request for the content identified by the second locator. For example, if the second content is a file, the redirector application may generate an HTTP or FTP request for the file.

At step 512, the redirector application may prepare a modified web page. In an embodiment of the invention, the modified web page may include the second content obtained by the redirector application in place of first content originally in the first web page. In this case, the redirector application may generate the modified web page, swapping the first content for the second content, so the modified web page includes the second content instead of the first content. This embodiment may be useful, for example, for replacing original text in the web page with substitute text.

In an alternative embodiment, the modified web page includes the second locator for the second content, instead of the first locator. However, the modified web page does not include the second content. Instead, the first locator is replaced by the second locator to generated the modified page. This embodiment mat be useful, for example, for replacing original non-textual or textual data with substitute content of any type that can be called using a URL.

At step 514, the modified web page may be provided to the web browser. The modified web page may be labeled as responsive to the browser request for the original page. Therefore, upon receiving the modified web page, the web browser may process it as if it were the original page, in place of the original page. The web browser may operate on the substitute page as known in the art. If the modified page includes substitute content, the browser may display the substitute content as if it were original content. If the modified web page includes a locator, such as a URL, for the second content, the web browser may obtain and output the second content when opening the page. In either case, the user is provided access to the substitute content as if it were the original content. Thus, an administrator of the original web page may configure a redirector application to provide substitute content in response to requests for the original page.

Having thus described a preferred embodiment of method and system for redirecting users to alternative content within a web page or other object, it should be apparent to those skilled in the art that certain advantages of the within system have been achieved. It should also be appreciated that various modifications, adaptations, and alternative embodiments thereof may be made within the scope and spirit of the present invention. For example, a method for modifying World Wide Web pages has been illustrated, but the inventive concepts described above would be equally applicable to other forms of content distributed over computer networks, including but not limited to video content or any other network hosted information. The invention is defined by the following claims.

The invention claimed is:

1. A method by a computer for redirecting a content request, the method comprising:
   receiving a request comprising an external page address for a first web page from a client device, the first web page comprising an external first locator included in the first web page for first content located on a first content server, wherein the first web page includes the first locator in lieu of the first content;
   obtaining a second locator based on the external first locator and the external page address in response to the request, wherein the second locator is not included in the first web page and locates second content that is distinct from the first content located on a second content server distinct from the first content server;
   preparing a modified web page comprising one of the second locator or the second content substituted for the external first locator, the modified web page enabling access to the second content in lieu of the first content using the modified web page; and
   providing the modified web page to the client device, based on determining that the client device is authorized to receive the one of the second locator or the second content.

2. The method of claim 1, further comprising obtaining the second locator by searching a database of associated locators.

3. The method of claim 1, further comprising determining whether the client device is authorized to receive the second locator.

4. The method of claim 3, wherein verifying the client device comprises providing a password to an authorization server.

5. The method of claim 1, further comprising obtaining the second locator by searching a database of associated locators using a network address for the first web page to identify the first and second locators.

6. The method of claim 1, further comprising obtaining the second content from the second content server.

7. The method of claim 1, wherein the computer comprises a server remote from the client device.

8. The method of claim 1, wherein the computer comprises the client device operating a redirector layer over a web browser application.

9. A apparatus for redirecting a content request, the apparatus comprising a processor coupled to memory, the memory holding instructions executable by the processor for:
   receiving a request comprising an external page address for a first web page from a client device, the first web page comprising an external first locator included in the first web page for first content located on a first content server, wherein the first web page includes the first locator in lieu of the first content;
   obtaining a second locator based on the external first locator and the external page address in response to the request, wherein the second locator is not included in the first web page and locates second content that is distinct from the first content located on a second content server distinct from the first content server;
   preparing a modified web page comprising one of the second locator or the second content substituted for the external first locator, the modified web page enabling access to the second content in lieu of the first content using the modified web page; and
   providing the modified web page to the client device, based on determining that the client device is authorized to receive the one of the second locator or the second content.

10. The apparatus of claim 9, wherein the memory holds further instructions for obtaining the second locator by searching a database of associated locators.

11. The apparatus of claim 9, wherein the memory holds further instructions for determining whether the client device is authorized to receive the second locator.

12. The apparatus of claim 11, wherein the memory holds further instructions for verifying the client device by providing a password to an authorization server.

13. The apparatus of claim 9, wherein the memory holds further instructions for obtaining the second locator by searching a database of associated locators using a network address for the first web page to identify the first and second locators.

14. The apparatus of claim 9, wherein the memory holds further instructions for obtaining the second content from the second content server.

15. The apparatus of claim 9, wherein the memory holds further instructions for communicating from a remote server remote to the client device.

16. The apparatus of claim 9, wherein the memory holds further instructions for operating on the client device configured as a redirector layer over a web browser application.

17. A non-transitory computer-readable medium holding instructions executable by a processor for:
   receiving a request comprising an external page address for a first web page from a client device, the first web page comprising an external first locator included in the first web page for first content located on a first content server, wherein the first web page includes the first locator in lieu of the first content;
   obtaining a second locator based on the external first locator and the external page address in response to the request, wherein the second locator is not included in the first web page and locates second content that is distinct from the first content located on a second content server distinct from the first content server;
   preparing a modified web page comprising one of the second locator or the second content substituted for the external first locator, the modified web page enabling access to the second content in lieu of the first content using the modified web page; and providing the modified web page to the client device, based on determining that the client device is authorized to receive the one of the second locator or the second content.

18. The non-transitory computer-readable medium of claim 17, holding further instructions for obtaining the second locator by searching a database of associated locators.

19. The non-transitory computer-readable medium of claim 17, holding further instructions for determining whether the client device is authorized to receive the second locator.

20. The non-transitory computer-readable medium of claim 19, holding further instructions for verifying the client device by providing a password to an authorization server.

21. The non-transitory computer-readable medium of claim 17, holding further instructions for obtaining the second locator by searching a database of associated locators using a network address for the first web page to identify the first and second locators.

22. The non-transitory computer-readable medium of claim 17, holding further instructions for obtaining the second content from the second content server.

23. The non-transitory computer-readable medium of claim 17, holding further instructions for communicating from a remote server remote to the client device.

24. The non-transitory computer-readable medium of claim 17, holding further instructions for operating on the client device configured as a redirector layer over a web browser application.

* * * * *